(12) United States Patent
Reznik et al.

(10) Patent No.: US 6,272,729 B1
(45) Date of Patent: *Aug. 14, 2001

(54) HIGH FIELD MICROMAGNETIC ROTOR AND METHOD OF MAKING SAME

(75) Inventors: Svetlana Reznik, Rochester; Edward P. Furlani, Lancaster; Gary R. Kenny, Rochester, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,146

(22) Filed: Oct. 30, 1998

(51) Int. Cl.$^7$ ....................................... H02K 15/02
(52) U.S. Cl. ................. 29/598; 29/609; 29/607; 335/284
(58) Field of Search ...................... 310/156, 261, 310/49 R, 40 MM; 335/284, 306, 302; 336/234; 29/609, 598, 607, 596

(56) References Cited

U.S. PATENT DOCUMENTS

| | | | |
|---|---|---|---|
| 3,553,832 | * | 1/1971 | Knechtel ............................ 29/607 |
| 3,893,059 | * | 7/1975 | Nowak ............................... 338/32 |
| 4,031,419 | * | 6/1977 | Spiesberger et al. ............. 310/49 R |
| 4,379,411 | * | 4/1983 | Laviano ........................... 73/861.78 |
| 4,677,331 | * | 6/1987 | Leitgeb ............................ 310/156 |
| 5,117,141 | * | 5/1992 | Hawsey et al. ................... 310/114 |
| 5,298,827 | * | 3/1994 | Sugiyama ......................... 310/156 |
| 5,448,117 | * | 9/1995 | Elliott ................................. 310/49 |
| 5,514,923 | * | 5/1996 | Gossler et al. .................... 310/74 |
| 5,554,902 | * | 9/1996 | Kessens et al. ................. 310/254 |
| 5,557,248 | * | 9/1996 | Prochazka ....................... 335/284 |
| 5,628,047 | * | 5/1997 | Hiroyoshi ......................... 419/62 |
| 5,628,670 | * | 5/1997 | Hill .................................. 446/487 |
| 5,682,072 | * | 10/1997 | Takahashi ........................ 310/156 |
| 5,737,650 | * | 4/1998 | Debesis et al. ................. 396/285 |

* cited by examiner

Primary Examiner—Allan N. Shoap
Assistant Examiner—Sean Smith
(74) Attorney, Agent, or Firm—David M. Woods

(57) ABSTRACT

A permanent magnet micro-rotor comprises a cylinder of magnetic material having a plurality of spaced-apart slots disposed around the periphery of the magnetic material. The magnetic material is magnetized by placing conductors in the spaced apart slots and energizing the conductors so that magnetic poles are formed between the spaced-apart slots.

4 Claims, 5 Drawing Sheets

HIGH FIELD MICROMAGNETIC ROTOR AND METHOD OF MAKING SAME

FIELD OF THE INVENTION

This invention relates to the fabrication of multipole permanent magnet rotors and, more particularly, to the fabrication of very high field magnetized micro-rotors for use in stepper motors, and the method of making same.

BACKGROUND OF THE INVENTION

Multipole cylindrical permanent magnets are widely used as rotors for conventional stepper motors. Conventional stepper motor rotors are as small as 0.2" in diameter with 8 alternating magnetic poles around their circumference. These rotors can be fabricated and polarized using standard technology. Specifically, such rotors are fabricated from a cylinder of magnetic material and polarized using fixtures made by threading standard gauge wire through holes in a block of phenolic or other suitable insulating material. The threading of the wire through the holes is done in a serpentine pattern generating the alternating poles of the rotor when a high current pulse is fired through the wires. This method is applicable when the requirements for the number of poles and the pole pitch are modest. However, as the number of poles increase, for example a 20 pole roller having a diameter of only 0.13", the pitch must be 0.2"; an increase by a factor of 10 in making the magnetized poles closer than that attained by use of the magnetizing fixtures known in the prior art.

SUMMARY OF THE INVENTION

The present invention is directed to overcoming one or more of the problems set forth above. In summary, one aspect of the present invention is directed to a permanent magnet micro-rotor comprising: a) a cylinder of magnetic material having a plurality of spaced-apart slots disposed around the periphery of said magnetic material; said magnetic material is magnetized by placing conductors in the spaced apart slots and energizing the conductors so that magnetic poles are formed between the spaced-apart slots.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1A:
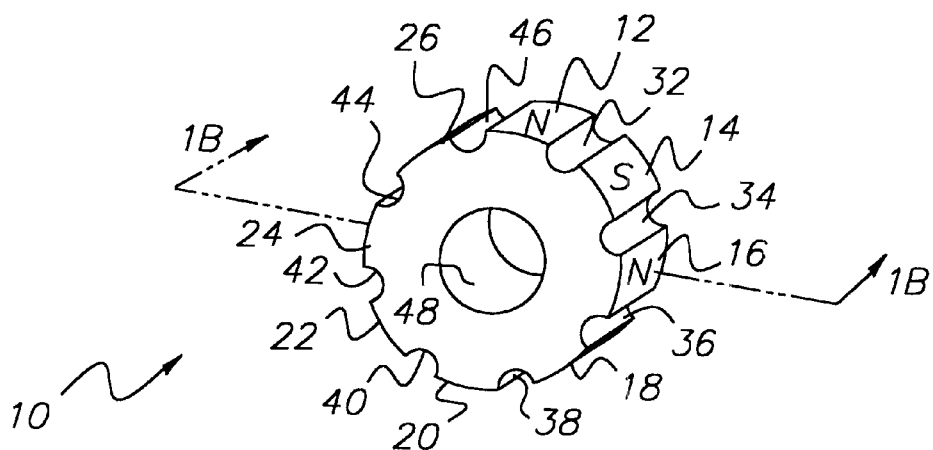
FIG. 1A illustrates the permanent magnet microrotor of the present invention in a perspective view.
Figure 1B:
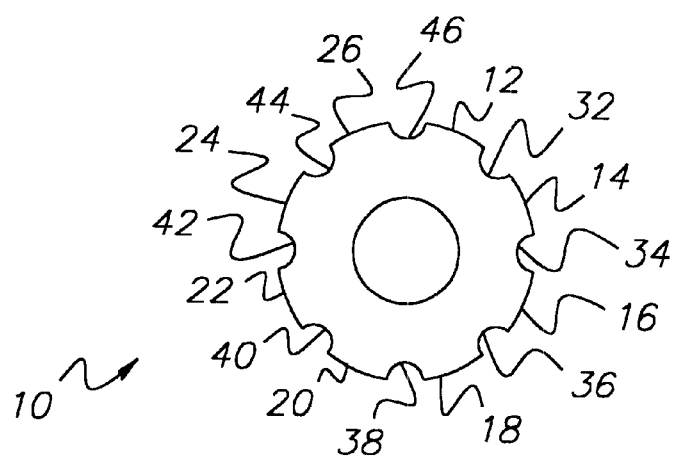
FIG. 1B is a cross-sectional view taken along line A—A of FIG. 1A.

Referring to FIGS. 1A and 1B, a permanent magnet cylindrical micro-rotor 10 is shown. The permanent magnet cylindrical micro-rotor 10 is magnetized with a plurality of alternating magnetic poles 12, 14, 16, 18, 20, 22, 24, and 26, around its circumference. These poles are respectively separated by a plurality of grooves 32, 34, 36, 38, 40, 42, 44, and 46. An axial hole 48 is positioned in the center portion of the micro-motor 10 for accepting a shaft (not shown). The fabrication of micro-rotor 10 is a multi-step process. First, a permanent magnet material is selected. Preferably, the micro-rotor 10 is fabricated from a high energy isotropic material (NdFeB) having a magnetic energy product (BH) max of 7.0 MGOe for injection molded parts, or from 10–12 MGOe for compression molded parts, or from 5–10 MGOe, and surface field at the center of a pole of up to 3000 Oe. Next, the selected magnetic material is formed into the shape of the micro-rotor 10. Typical dimensions of the micro-rotor 10 are OD from 0.012" to 0.500". In the preferred embodiment, the outside diameter is 0.130", inside diameter is 0.05511" and the length is 0.059". It is instructive to note the presence of the surface grooves on the micro-rotor 10; these grooves permit a higher degree of magnetization of the micro-rotor 10 thereby enhancing its field strength and performance as will be described hereinbelow. The micro-rotor 10 can be done by injection molding process, compaction (compression) molded process, or extrusion process. For example, for the magnet rotor, the magnet could be made from a block of material that was made from one of these processes and wired by an electric discharge machine (EDM) to the desired specification.

The final step in the fabrication of micro-rotor 10 is its magnetization. Prior art magnetization processes were described hereinabove in the background, where the magnetic material is exposed to the high magnetic field, and the magnetizer circuits included capacitors bank, ignitron or thyristor, and pulse transformers. Preferably, in the present invention, approximately 2400 micro Farads and 1800 volts are use. The fabrication of the magnetizing fixture is described below.

Figure 2:
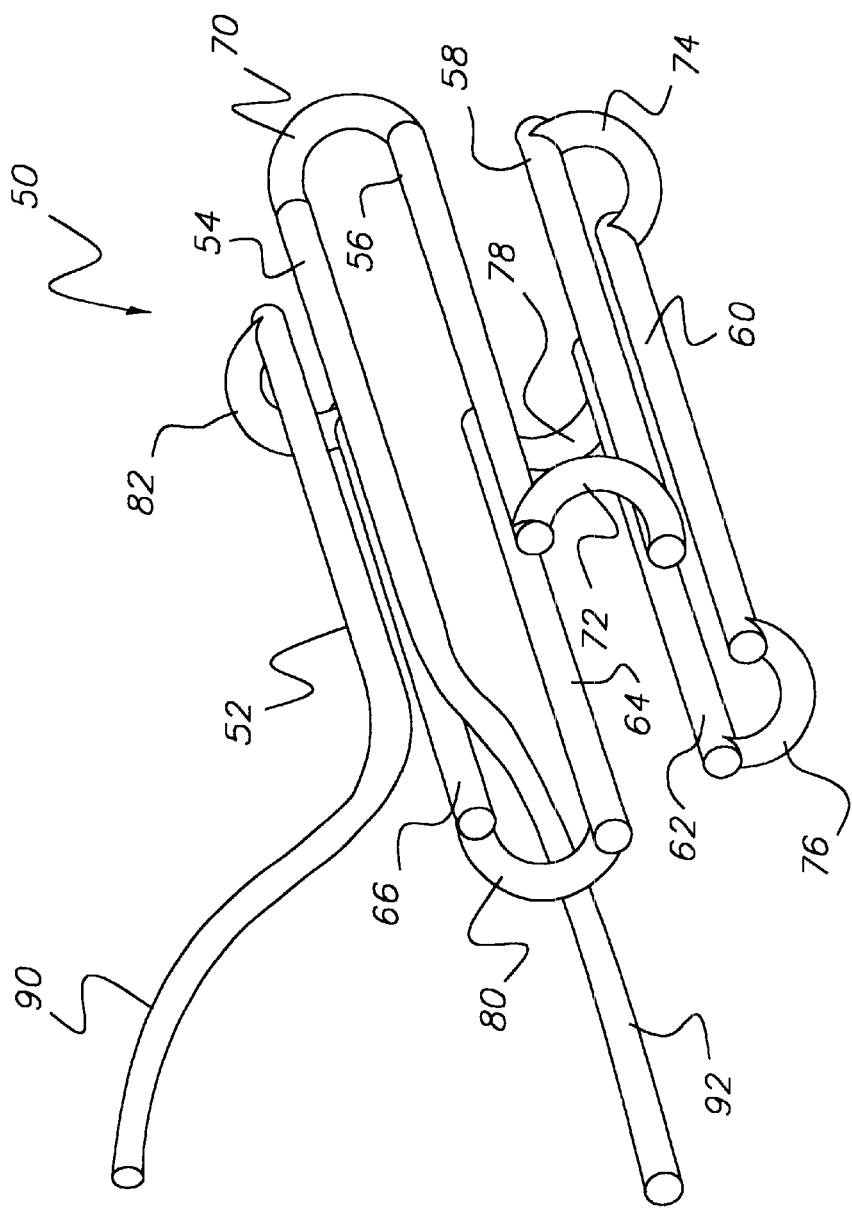
FIG. 2 is a perspective view of a conductive structure of the present invention.

Referring to FIG. 2, a conductive structure 50 of the present invention for magnetizing the rotor is shown. The constructive structure 50 is an element of the present invention that provides a magnetizing fixture for magnetizing the micro-rotor 10, as will be described. The conductive structure 50 includes a series of spaced-apart conductive bars 52, 54, 56, 58, 60, 62, 64, and 66, conductive connectors 70, 72, 74, 76, 78, 80, and 82, and lead wires 90 and 92. The pairs of conductive bars 54–56, 56–58, 58–60, 60–62, 62–64, 64–66, and 66–52 are electrically connected at one end by the conductive connectors 70, 72, 74, 76, 78, 80, and 82, respectively, as shown. Lead wires 90 and 92 are electrically connected to the ends of conductive bars 52 and 54 as shown.

Figure 3:
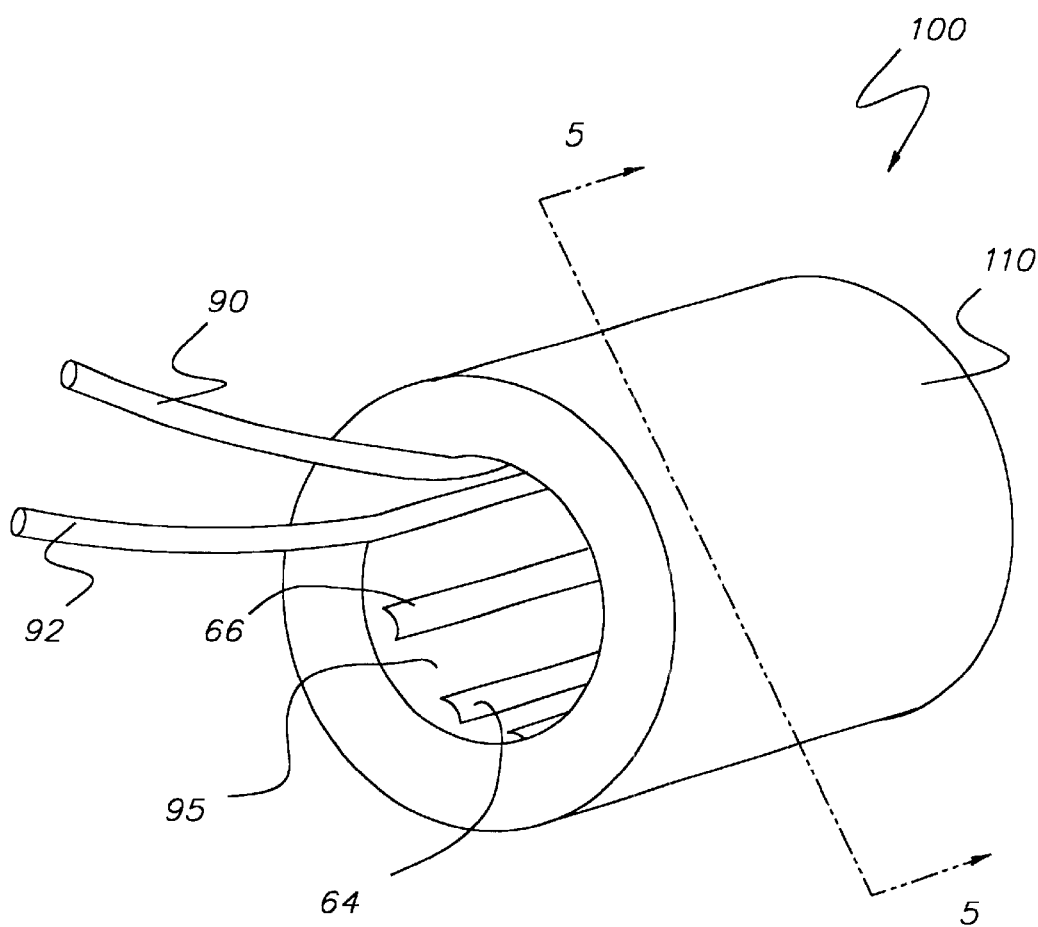
FIG. 3 is a perspective view of the magnetizing fixture of the present invention.

Referring to FIG. 3, a magnetizing fixture 100 of the present invention into which magnetizing fixture 100 the conductive structure 50 (as shown in FIG. 2) is mated, as described hereinbelow. The magnetizing fixture 100 includes an insulating support structure 110 that encases the conductive structure 50. To fabricate the magnetizing fixture 100, the conductive structure 50 is potted using an insulating epoxy, and the center of the potted structure is axially cored out to provide a cavity 95 into which the micro-rotor 10 fits with a small amount of clearance therebetween. The cavity 95 is of such dimensions that portions of the conductive bars 52, 54, 56, 58, 60, 62, 64, and 66 protrude into cavity 95 and are exposed as shown (only exposed portions of conductive bars 64 and 66 are shown).

Figure 4A:
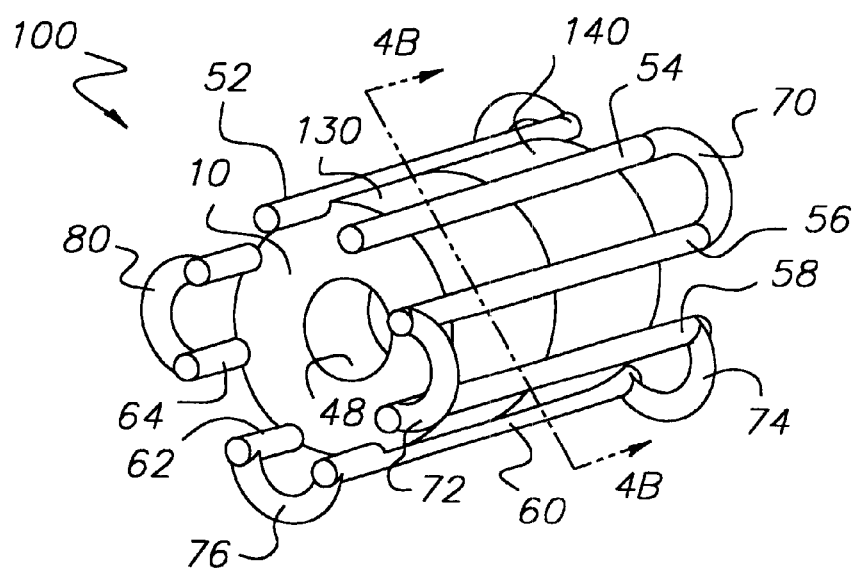
FIG. 4A is the electrical structure of the fixture of the present invention shown in a perspective view.
Figure 4B:
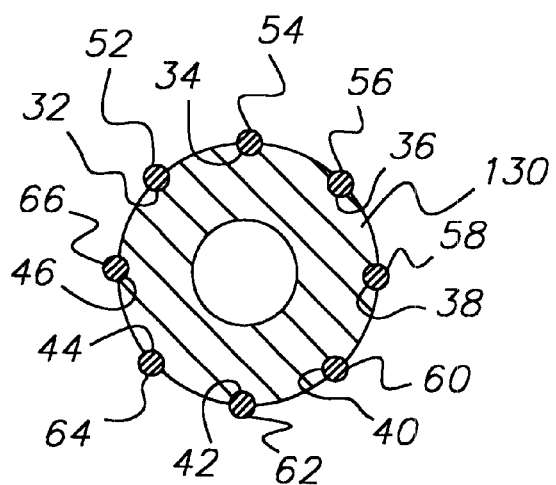
FIG. 4B is a cross-sectional view taken along line A—A of FIG. 4A.

Referring to FIGS. 4A and 4B, the electrical structure of the fixture 100 is shown without the insulating support structure 110 (as shown in FIG. 3). In FIG. 4A, the rotors 130 and 140 are shown positioned in the fixture 100, prior to magnetization. It is a feature of the present invention that when the unmagnetized rotors 130, and 140 are properly seated in the fixture 100, the grooves 32, 34, 36, 38, 40, 42, 44, and 46 of unmagnetized rotors 130, and 140 are aligned with, and partially surround, conductive bars 52, 54, 56, 58, 60, 62, 64, and 66, respectively, as shown. This is to be noted that, when a pulse (50 to 100 microseconds) of high current (10,000 to 50,000 amps) flows through the conductive bars 52, 54, 56, 58, 60, 62, 64, and 66, the magnetic field that they produce penetrates unmagnetized rotors 130, and 140 thereby magnetizing them with the magnetization pattern shown in FIGS. 1A and 1B. The present invention is directed to the magnetization of high coercivity micro-rotors (Hci is approximately 10 kOe). To meet impedance of the magnetizer to the fixture, a high magnetic energy is needed. To insure saturation of the magnetic material, it is necessary that the magnetizing field be greater than the coercivity of the material being magnetized. This requires sufficient current flowing through the conductive structure to provide the required field. On the other hand, too high a current can result in electromagnetically induced stresses of sufficient intensity to cause the fixture to explode. To magnetize the above referenced micro roller of NdFeB, intrinsic coercivity of about 10000 Oe, with OD=0.6", ID=0.5", and L=0.1", and having from 36 to 48 poles, a Model 8500 magnetizer, manufactured by Magnetic Instrumentation, Inc., had its capacitor bank tailored to the size of the fixture. The magnetizer's capacitor bank, set at 1600 micro farads was charged to 1600 volts and discharged by an Ignitron through the fixture. Current pulses on the order of 50,000 amperes, lasting approximately 50–100 microseconds saturate the NdFeB microrotor without damage to the fixture.

Figure 5:
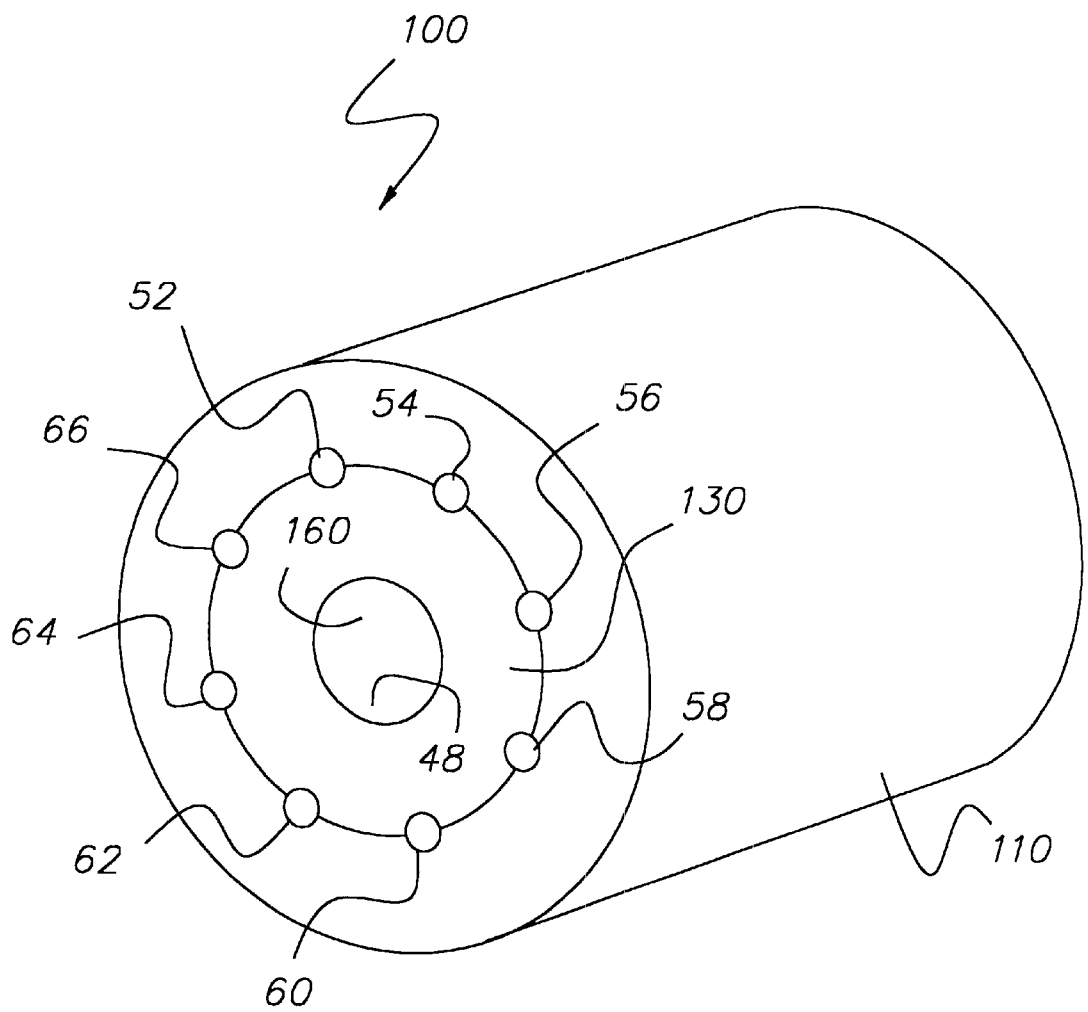
FIG. 5 is a cross-sectional view of the magnetizing fixture of the present invention taken along line B—B of FIG. 3.

Referring to FIG. 5, a cross-sectional view of the magnetizing fixture 100 is shown taken along line B—B of FIG. 3. Before the unmagnetized rotor 130 is magnetized, a soft ferromagnetic element 160 is inserted into the axial hole (cavity) 48 of unmagnetized rotor 130. The ferromagnetic element 160 is preferably formed from a soft magnetic material including permalloy, supermalloy, sendust, iron, nickel, nickel-iron or alloys thereof. The function of the ferromagnetic element 160 is to enhance the penetration of the magnetizing field created by energized conductive bars 52, 54, 56, 58, 60, 62, 64, and 66, thereby enhancing the magnetization of rotor 130. This, in turn, enhances the performance of the stepper motor.

The invention has been described with reference to a preferred embodiment. However, it will be appreciated that variations and modifications an be effected by a person of ordinary skill in the art without departing from the cope of the invention.

PARTS LIST 10 micro-rotor
12 alternating magnetic pole
14 alternating magnetic pole
16 alternating magnetic pole
18 alternating magnetic pole
20 alternating magnetic pole
22 alternating magnetic pole
24 alternating magnetic pole
26 alternating magnetic pole
32 groove
34 groove
36 groove
38 groove
40 groove
42 groove
44 groove
46 groove
48 axial hole
50 conductive structure
52 conductive bar
54 conductive bar
56 conductive bar
58 conductive bar
60 conductive bar
62 conductive bar
64 conductive bar
66 conductive bar
70 conductive connector
72 conductive connector
74 conductive connector
76 conductive connector
78 conductive connector
80 conductive connector
82 conductive connector
90 lead wire
92 lead wire
95 cavity
100 magnetizing fixture
110 insulating support structure
130 unmagnetized rotor
140 unmagnetized rotor
160 ferromagnetic element

What is claimed is:

1. A method of magnetizing a magnetic micro-rotor, the method comprising the steps of:

a) providing a magnetic micro-rotor having a plurality of spaced-apart slots disposed on a periphery of the magnetic micro-rotor;

b) providing conductive structure having a portion of which mate to the plurality of spaced-apart slots;

c) providing an insulating support structure separate from the micro-rotor for supporting said conductive structure;

d) mating the micro-rotor with said conductive structure so that a portion of said conductive structure rest adjacent spaced-apart slots; and e) flowing current through said conductive structure whereby magnetic fields are generated causing a pole pattern to be magnetically formed in the micro-rotor.

2. The method as in claim 1, wherein step (c) includes providing a cavity in said insulating support structure, and wherein step (d) includes inserting said micro-rotor into the cavity.

3. The method as in claim 1, wherein step (b) includes potting said conductive structure with an insulating potting material and axially boring said structure to provide a cavity that accepts said micro-rotor.

4. The method as claimed in claim 1 wherein the slots are grooves formed on the periphery of the magnetic micro-rotor so that a portion of said conductive structure rest within adjacent spaced-apart grooves.

* * * * *